United States Patent
Fukuhara et al.

(10) Patent No.: US 7,362,893 B2
(45) Date of Patent: Apr. 22, 2008

(54) IMAGE ENCODING APPARATUS AND METHOD, AND IMAGE DECODING APPARATUS AND METHOD

(75) Inventors: Takahiro Fukuhara, Kanagawa (JP); Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 652 days.

(21) Appl. No.: 10/984,973

(22) Filed: Nov. 10, 2004

(65) Prior Publication Data

US 2005/0123204 A1 Jun. 9, 2005

(30) Foreign Application Priority Data

Nov. 20, 2003 (JP) ............... 2003-391361

(51) Int. Cl.
*G06K 9/00* (2006.01)
(52) U.S. Cl. ............ 382/166; 382/232; 382/233; 382/167
(58) Field of Classification Search ......... 382/232, 382/233, 162, 166, 167, 165; 358/530, 502, 358/518, 523; 347/43; 345/600
See application file for complete search history.

(56) References Cited

U.S. PATENT DOCUMENTS 5,357,354 A * 10/1994 Matsunawa et al. ........ 358/530
5,608,549 A * 3/1997 Usami ..................... 358/530
5,742,520 A * 4/1998 Uchikawa et al. .......... 358/518

FOREIGN PATENT DOCUMENTS

JP 409009069 A * 1/1997

* cited by examiner

*Primary Examiner*—Anh Hong Do
(74) *Attorney, Agent, or Firm*—Oblon, Spivak, McClelland, Maier & Neustadt, P.C.

(57) ABSTRACT

In a color converter unit of an image encoding apparatus, a subtractor unit subtracts Y from Z and a divider unit divides the result of this subtraction (Z−Y) by 2 and supplies the result to a component signal Y1 to an image coding unit. Another subtractor unit subtracts Y from X and another divider unit divides the result of this subtraction (X−Y) by 2 and supplies the result as a component signal Y2 to the image coding unit. Y remains unprocessed and is supplied as a component signal Y0 to the image coding unit. The image coding unit compression-codes the converted three component signals Y0, Y1, Y2 according to the JPEG-2000 system to generate an encoded code stream. Thus, an image in the XYZ color space is compressed and expanded highly efficiently.

14 Claims, 11 Drawing Sheets

IMAGE ENCODING APPARATUS AND METHOD, AND IMAGE DECODING APPARATUS AND METHOD

BACKGROUND OF THE INVENTION

1. Field of the Invention

This invention relates to an image encoding apparatus and method for encoding an image in the XYZ color space to generate an encoded code stream, and an image decoding apparatus and method for decoding the generated encoded code stream.

This application claims priority of Japanese Patent Application No. 2003-391361, filed on Nov. 20, 2003, the entirety of which is incorporated by reference herein.

2. Description of the Related Art

As a typical conventional image compression system, the JPEG (Joint Photographic Experts Group) system standardized by ISO (International Standards Organization) is used. It is known that the JPEG system uses discrete cosine transform (DCT) and provides good encoded and decoded images in the case where relatively high bits are allocated. However, if the number of coded bits is reduced to a certain value or less, block distortion proper to DCT becomes remarkable and deterioration becomes noticeable as viewed subjectively.

Recently, systems for dividing an image into plural bands by a filter called filter bank made up of a combination of a high-pass filter and a low-pass filter and then encoding each band have been studied eagerly. Of these systems, wavelet transform coding has no problem of block distortion due to high compression as in DCT and therefore it is expected to be a new technique that replaces DCT.

The JPEG-2000 system, completed in international standardization in January 2001, employs a combination of this wavelet transform and high-efficiency entropy coding (bit modeling by bit plane and arithmetic coding). It realizes significant improvement in coding efficiency, compared with the JPEG system (see, for example, the following Patent Reference 1). Moreover, the JPEG-2000 system can handle up to 38 bits (per component) while the JPEG system can handle only up to eight bits.

Patent Reference 1: JP-A-2002-165098

The JPEG system generally uses YCbCr as its color space, but the JPEG-2000 system, which is an extended system, can handle various color spaces such as sYCC, sRGB, Lab and XYZ as file formats. Particularly, DCI (Digital Cinema Initiatives), which is a digital cinema standardization organization, has almost determined to employ the CIE XYZ color space having the largest color range, and development of a technique for highly efficiently compressing and expanding images in the XYZ color space is expected. However, no such technique has been proposed yet.

SUMMARY OF THE INVENTION

In view of the foregoing status of the art, it is an object of this invention to provide an image encoding apparatus and method for highly efficiently compression-coding an image in the XYZ color space, for example, according to the JPEG-2000 system, to generate an encoded code stream, and an image decoding apparatus and method for decoding the generated encoded code stream.

To achieve the above-described object, an image encoding apparatus and method according to this invention includes a color converter unit for converting an X signal and a Z signal of an image in the XYZ color space to component signals of a coordinate system about a point representing an achromatic color, and an image coding unit for encoding each of the component signals after color conversion by the color converter unit and a Y signal.

In this case, the color converter unit generates a first component signal by subtracting the Y signal from the Z signal and then dividing the result of the subtraction by 2, and also generates a second component signal by subtracting the Y signal from the X signal and then dividing the result of the subtraction by 2.

Also, to achieve the above-described object, an image decoding apparatus and method according to this invention is for decoding the encoded code stream generated by the image encoding apparatus and method as described above. The image decoding apparatus and method includes an image decoding unit for decoding the encoded code stream, and an inverse color converter unit for inversely converting each component signal after decoding by the image decoding unit to the coordinate system in the XYZ color space.

In this case, the inverse color converter unit restores the Z signal by multiplying the first component signal by 2 and then adding the Y signal to the result of the multiplication, and also restores the X signal by multiplying the second component signal by 2 and then adding the Y signal to the result of the multiplication.

In the image encoding apparatus and method and the image decoding apparatus and method as described above, when encoding and decoding an image in the XYZ color space, the X signal and the Z signal of the image in the XYZ color space are converted to signals on the coordinate axis about a point representing an achromatic color, and each of the component signals after conversion and the Y signal are encoded. Then, after the component signals are decoded, the original component signals in the XYZ color space are restored.

In the image encoding apparatus and method and the image decoding apparatus and method as described above, when encoding and decoding an image in the XYZ color space, the X signal and the Z signal of the image in the XYZ color space are converted to signals on the coordinate axis about a point representing an achromatic color. Therefore, in the case of an image containing many achromatic colors like a natural image, the value is 0 at a high proportion and the compression efficiency can be improved. The component signals after color conversion can be decoded on the decoding side to restore the original component signals in the XYZ color space.

BRIEF DESCRIPTION OF THE DRAWINGS

FIGS. 9A to 9C are views for explaining a bit plane.

DESCRIPTION OF THE PREFERRED EMBODIMENTS

Hereinafter, specific embodiments of this invention will be described in detail with reference to the drawings. In the embodiments, this invention is applied to an image encoding apparatus and method for highly efficiently compression-coding an image in the XYZ color space, for example, according to the JPEG-2000 system, to generate an encoded code stream, and an image decoding apparatus and method for decoding the generated encoded code stream.

Before explaining the specific embodiments, the XYZ color space will now be briefly described.

The color space of an image displayed on a display of a personal computer or the like is the RGB color space. RGB represent the primary colors of light. It is known that all the colors existing in nature cannot be expressed in the RGB color space. For example, light of R must be given a negative value in order to express the color of violet to yellow-green single-color light, but it is virtually impossible to express such a color because each of RGB can take only a positive value.

Since there is a problem in giving a negative value in the case of expressing a color by means of a quantity of mixture of the primary colors, virtual primary colors that can express all the colors with positive values are introduced and this system is called XYZ colorimetric system. In the procedures according to this system, mathematical conversion is carried out so that RGB will not have negative values.

In the XYZ colorimetric system, Y represents brightness called "luminous reflectance". XYZ and RGB are not equal, but increase of X affects R of RGB most. Similarly, Y largely affects G, and Z largely affects B. Therefore, if this is expressed as changes of color, increase of X tends to increase redness, increase of Y tends to increase greenness, and increase of Z tends to increase blueness.

The primary colors used for print ink are magenta, cyan and yellow. The XYZ values of these primary colors in subtractive color mixture used for printing are set as follows.

Magenta: X=34.61, Y=19.30, Z=23.59
Cyan: X=23.16, Y=28.47, Z=66.93
Yellow: X=68.23, Y=78.03, Z=22.88

The tristimulus values of RGB can be converted to the tristimulus values of XYZ by using conversion coefficients of color matching functions, as expressed by the following equations (1) to (3).

$$X = 2.7690R + 1.7517G + 1.1301B \quad (1)$$

$$Y = 1.0000R + 4.5907G + 0.0601B \quad (2)$$

$$Z = 0.0000R + 0.0565G + 5.5928B \quad (3)$$

The conversion formula of Y is the same as the equation to calculate luminance in the RGB colorimetric system (Y=R+4.5907G+0.0601B). That is, as the calculated value Y of the tristimulus values of XYZ represents the luminance itself, this is very convenient.

To summarize the above explanation, X is a color close to red and having no brightness (0), Y is a color close to green and having brightness, and Z is a color close to blue and having no brightness (0).

Figure 1:
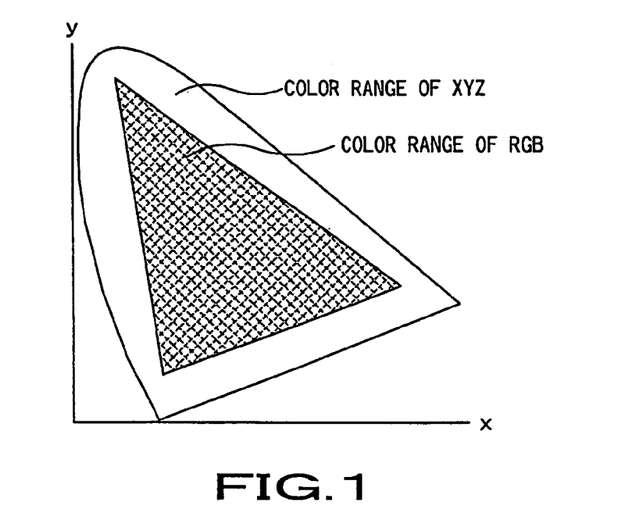
FIG. 1 is a view showing the color range of the RGB color space and the color range of the XYZ color space.

FIG. 1 shows the color range of the RGB color space and the color range of the XYZ color space. As seen from FIG. 1, the color range of the XYZ color space is broader than the color range of the RGB color space. In an image encoding apparatus and an image decoding apparatus that will be described hereinafter, an image in the XYZ color space having the broader color range than the RGB color space is compressed and expanded highly efficiently.

(1) First Embodiment

Figure 2:
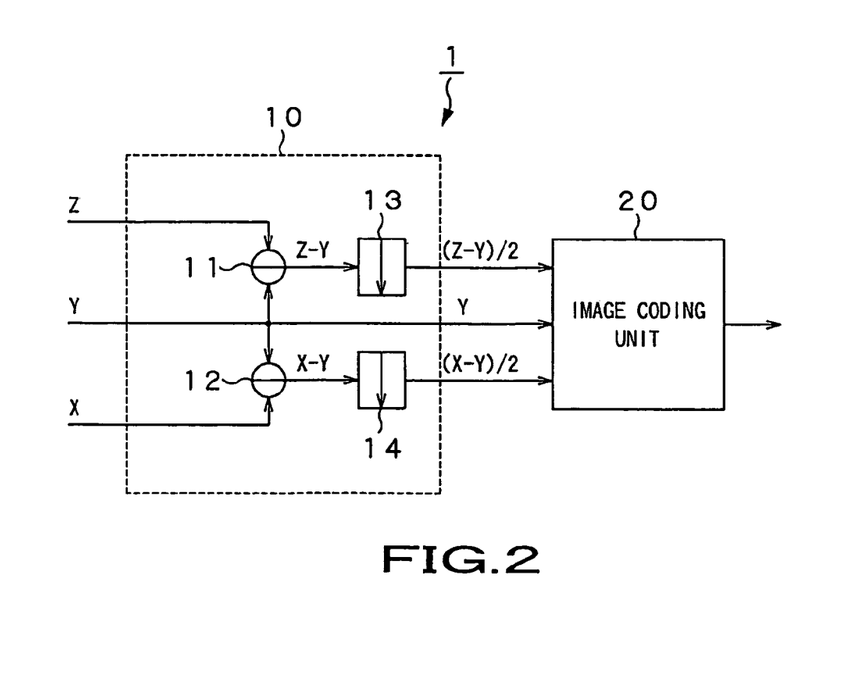
FIG. 2 is a view showing a schematic structure of an image encoding apparatus in a first embodiment.

First, the structure and operation of an image encoding apparatus in a first embodiment will be described. FIG. 2 shows a schematic structure of the image encoding apparatus 1 in the first embodiment. As shown in FIG. 2, the image encoding apparatus 1 includes a color converter unit 10 for performing predetermined conversion of inputted three component signals of X, Y and Z, and an image coding unit 20 for compression-coding the converted signal according to the JPEG-2000 system. This image coding unit 20 may be constituted by hardware or software as long as it has an encoder function conformable to Part-1 described in the JPEG-2000 standard (reference: ISO/IEC 15444-1, Information technology—JPEG 2000, Part 1: Core coding system).

As described above, of the three component signals of X, Y and Z, only Y has brightness, and X and Z have no brightness (0). These are largely different from R, G and B, each which can take brightness values other than 0. Therefore, in the case of encoding an image in the XYZ color space, for example, according to the JPEG-2000 system, high coding efficiency may not be achieved even if the image in the XYZ color space is directly inputted and compression-coded as in the case of an image in the RGB color space.

Thus, in the image encoding apparatus 1 in the first embodiment, the color converter unit 10 is provided on the stage preceding the image coding unit 20, and it performs predetermined conversion of the three component signals of X, Y and Z so as to enable high-efficiency compression-coding of the image in the XYZ color space.

The color converter unit 10 includes subtractor units 11, 12, and divider units 13, 14, as shown in FIG. 2. The subtractor unit 11 subtracts Y from Z. The divider unit 13 divides the result of the subtraction (Z−Y) by 2 and supplies the result of the division ((Z−Y)/2) as a component signal Y1 to the image coding unit 20. The divider unit 13 may perform shift operation to shift to right by one bit, instead of division by 2. The subtractor unit 12 subtracts Y from X. The divider unit 14 divides the result of the subtraction (X−Y) by 2 and supplies the result of the division ((X−Y)/2) as a component signal Y2 to the image coding unit 20. Again, the divider unit 14 may perform shift operation to shift to right by one bit, instead of division by 2. Of the three component signals of X, Y and Z, Y, which is the only component signal having brightness, remains unprocessed and is supplied as a component signal Y0 to the image coding unit 20. The above-described color conversion can be expressed by the following equations (4) to (6).

$$Y0=Y \quad (4)$$

$$Y1=(Z-Y)/2 \quad (5)$$

$$Y2=(X-Y)/2 \quad (6)$$

The image coding unit 20 compression-codes these converted three component signals Y0, Y1 and Y2 according to the JPEG-2000 system to generate an encoded code stream, and outputs the generated encoded code stream.

The technical reasons and background of the structure of the color converter unit 10 will now be described.

The ratios of X, Y and Z to the sum of the tristimulus values of XYZ are defined as x, y and z, respectively, as expressed by the following equations (7) to (9).

$$x=X/(X+Y+Z) \quad (7)$$

$$y=Y/(X+Y+Z) \quad (8)$$

$$z=Z/(X+Y+Z) \quad (9)$$

Figure 3:
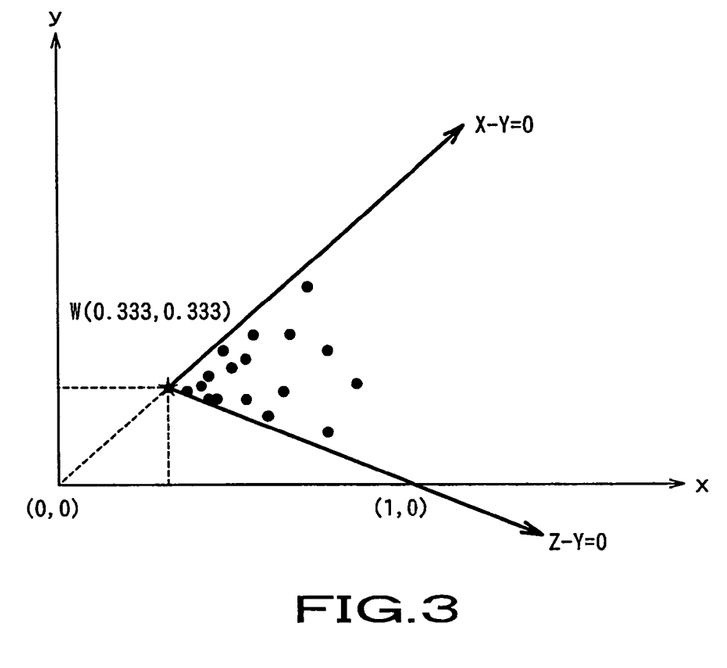
FIG. 3 is a view showing conversion of X, Y and Z to a coordinate system about W (achromatic color point).

If X−Y=0 and Z−Y=0 are plotted in a chromaticity diagram, they are represented by a straight line passing through a point (0, 0) and a point W (x=0.333, y=0.333) and a straight line passing through a point (1, 0) and the point W (x=0.333, y=0.333), and X−Y and Z−Y are converted to coordinate axes intersecting at W, as shown in FIG. 3. As a matter of convenience, this point W is called achromatic color point. It can also be said that the above-described equations (4) to (6) convert X and Z to component signals in the coordinate system about W (achromatic color point).

Achromatic colors will now be described briefly. Colors can be roughly classified into chromatic colors and achromatic colors. Chromatic colors are colors having hue, brightness (lightness) and sharpness (saturation). For example, a color of red is expressed by the property of brightness representing bright red or dark red, as well as the property of hue representing yellowish red or purplish red and the property of sharpness representing sharp red or dull red. On the other hand, achromatic colors are colors expressed only by brightness (lightness). Achromatic colors are expressed only within a range of bright to dark, that is, white to gray to black, and they do not have hue or sharpness. Therefore, it is known achromatic colors do not affect other colors.

It is generally known that a natural image contains many achromatic colors. It can be understood that the compression effect improves with respect to achromatic colors because of Y1=(Z−Y)/2=0 from the equation (5) and Y2=(X−Y)/2=0 from the equation (6). In the case of a color close to an achromatic color, even if the value 0 is not achieved, the values of Y0 and Y2 become smaller and the compression rate can be improved, compared with the case of compressing X, Y and Z themselves.

In this manner, in the image encoding apparatus 1, when encoding an image in the XYZ color space, each component signal of the image in the XYZ color space is converted to a signal on the coordinate axis about an achromatic color point. Therefore, for an image containing many achromatic colors like a natural mage, the value is often converted to 0 and the compression efficiency can be improved.

(1-2) Modification

An image in the XYZ color space inputted to the image encoding apparatus 1 may have already been gamma-corrected. Simply put, gamma correction is a technique for correcting a change when a digital signal outputted from a calculator becomes an analog signal and is projected on a cathode ray tube. In a graph where the horizontal axis represents intensity of input and the vertical axis represents brightness, the brightness should be in direct proportion to the intensity of input, forming a straight line with its right side up. However, when the signal is actually inputted to the cathode ray tube, the brightness is not directly proportional to the intensity of input and a curve is shown in the graph. The degree of this curvature is expressed by a gamma value, and the larger the gamma value is, the greater the degree of curvature of the curve is. If the direct proportion between the intensity of input and the brightness that shows a straight line in the graph is expressed by a gamma value of 1.0, adjustment to reach a gamma value of approximately 2.2 is typically carried out.

In the case where an image in the XYZ color space has already been gamma-corrected as described above, the influence of the gamma correction must be eliminated before the image coding unit 20.

Figure 4:
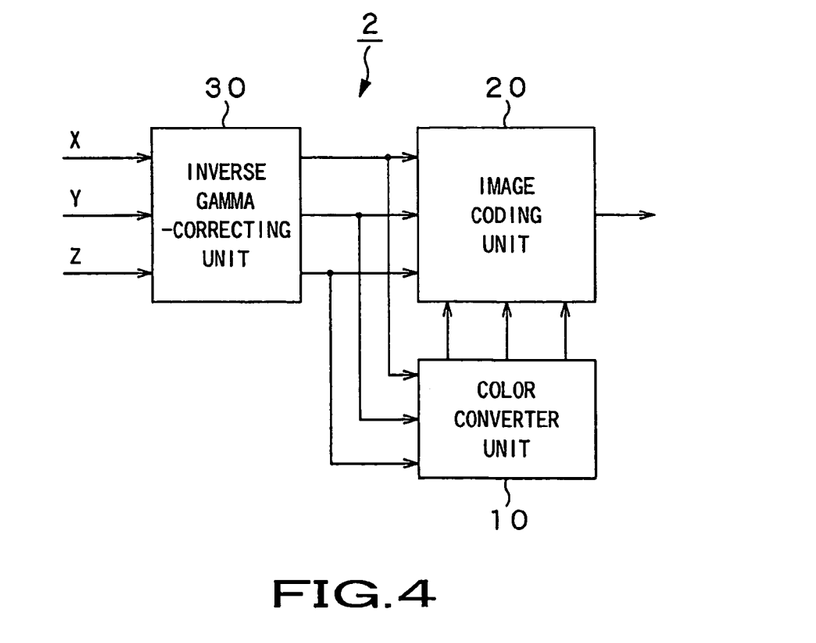
FIG. 4 is a view showing a schematic structure of an image encoding apparatus having an inverse gamma-correcting unit.

Thus, in such a case, an inverse gamma-correcting unit 30 is provided on the stage preceding the image coding unit 20 so as to enable inverse gamma correction, as in an image encoding apparatus 2 shown in FIG. 4. For example, if the gamma coefficient is 2.4, the inverse gamma-correcting unit 30 can perform inverse gamma correction according to the following equations (10) to (12).

$$X'=X^{(1/2.4)} \quad (10)$$

$$Y'=Y^{(1/2.4)} \quad (11)$$

$$Z'=Z^{(1/2.4)} \quad (12)$$

The XYZ image after the gamma correction can be color-converted by the color converter unit 10, in a manner similar to the above-described processing. If color conversion is skipped, the XYZ image may be directly inputted to the image coding unit 20.

(2) Second Embodiment

Figure 5:
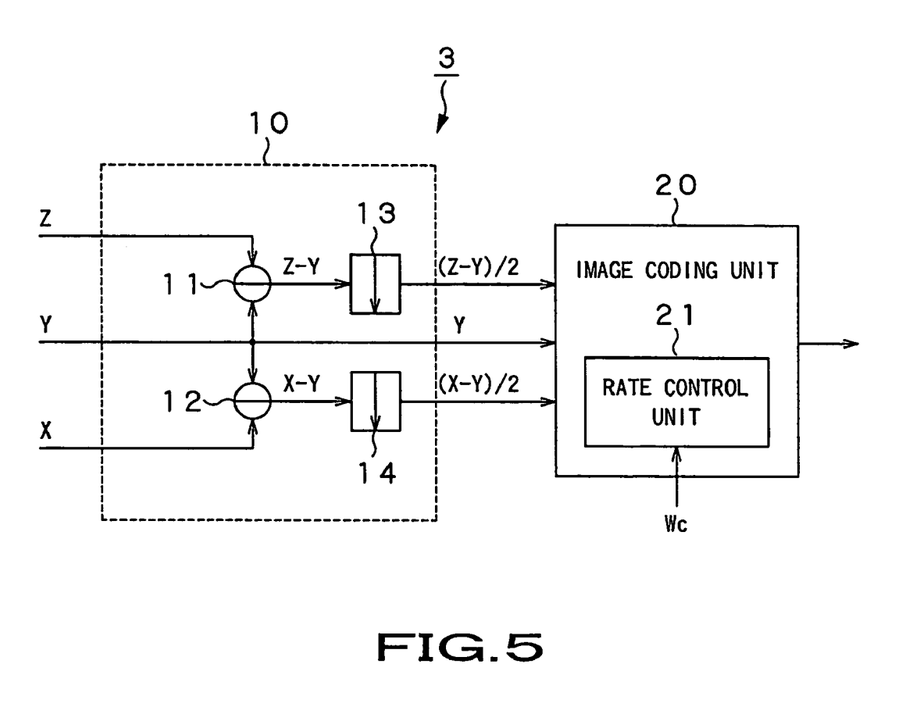
FIG. 5 is a view showing a schematic structure of an image encoding apparatus in a second embodiment.

Next, an image encoding apparatus 3 shown in FIG. 5 as a second embodiment has a fundamental structure similar to that of the image encoding apparatus 1 shown in FIG. 2, but it is characterized by having a rate control unit 21 for performing rate control to achieve a target code quantity by using a weighting coefficient for each component. Therefore, the same structural elements as those of the image encoding apparatus 1 shown in FIG. 2 are denoted by the same numerals and will not be described further in detail.

Figure 6:
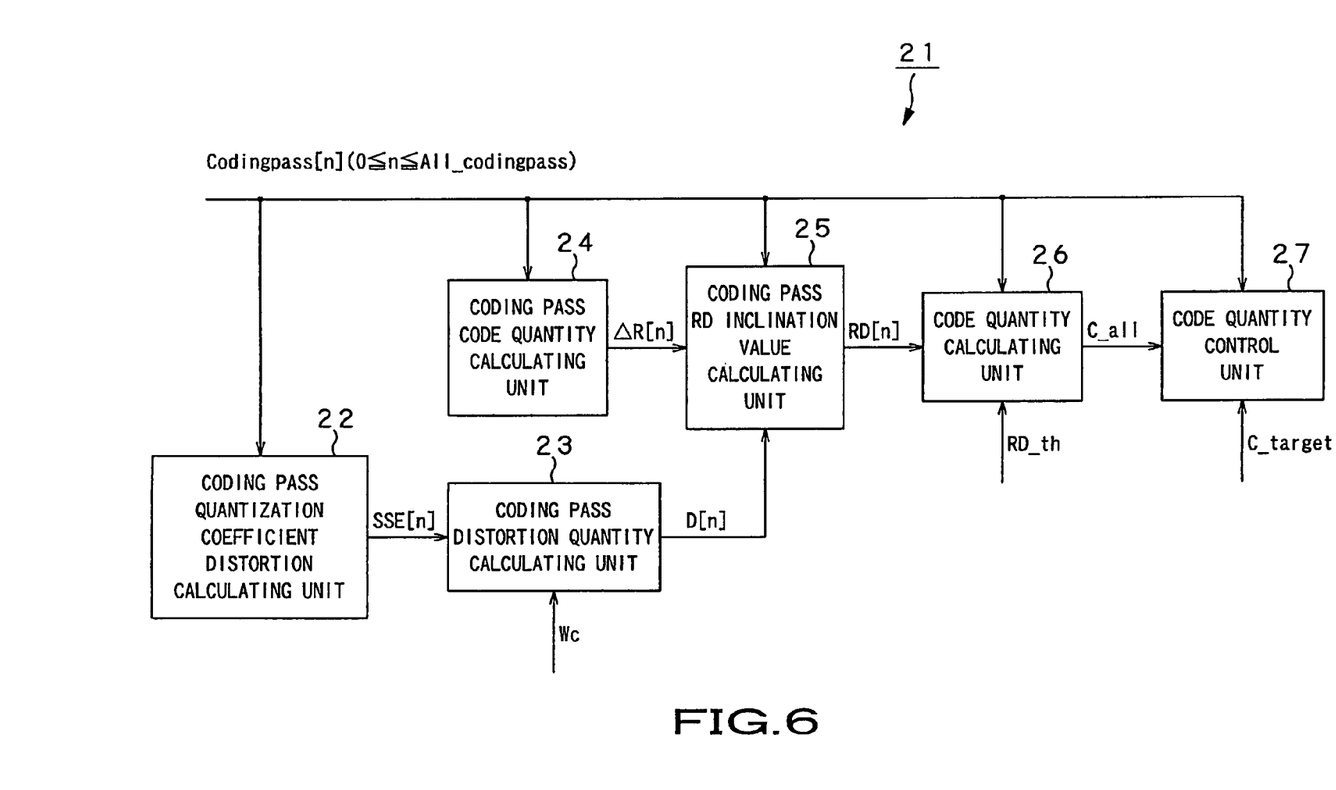
FIG. 6 is a view showing the internal structure of a rate control unit of the image encoding apparatus.

FIG. 6 shows the detailed structure of the rate control unit 21. As shown in FIG. 6, the rate control unit 21 includes a coding pass quantization coefficient distortion calculating unit 22 for calculating quantization coefficient distortion of each coding pass, a coding pass distortion quantity calculating unit 23 for calculating the quantity of distortion of each coding pass, a coding pass code quantity calculating unit 24 for calculating the quantity of code of each coding pass, a coding pass RD inclination value calculating unit 25 for calculating RD (rate distortion) inclination value of each coding pass, a code quantity calculating unit 26 for calculating the quantity of code, and a code quantity control unit 27 for controlling the quantity of code.

Figure 7A:
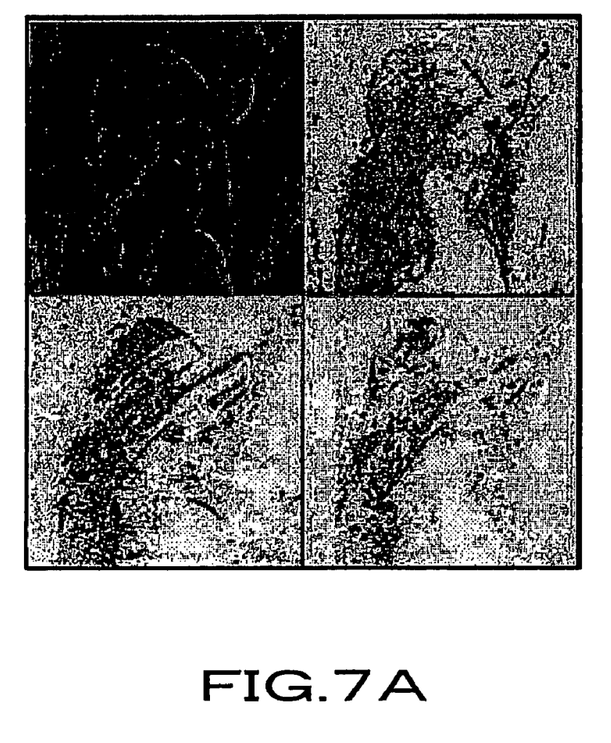
FIGS. 7A and 7B are views for explaining a subband in the case where an actual image is wavelet-transformed.
Figure 7B:
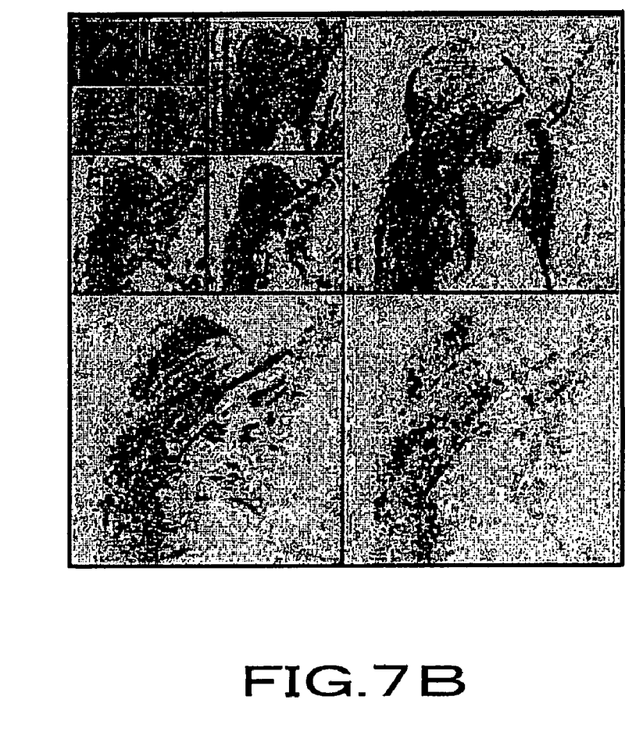

The image coding unit 20 performs wavelet transform of an input image and then scalar quantization of the generated wavelet transform coefficient. In the wavelet transform, low-range components are usually transformed repeatedly, as shown in FIGS. 7A and 7B. This is because most of the energy of the image is concentrated at low-range components. This can be understood from the fact that subbands are formed as shown in FIGS. 7A and 7B as the division level is shifted, for example, from the division level=1 shown in FIG. 7A to the division level=3 shown in FIG. 7B. The division level in the wavelet transform in FIG. 7B is 3. As a result, 10 subbands are formed in total.

Figure 8:
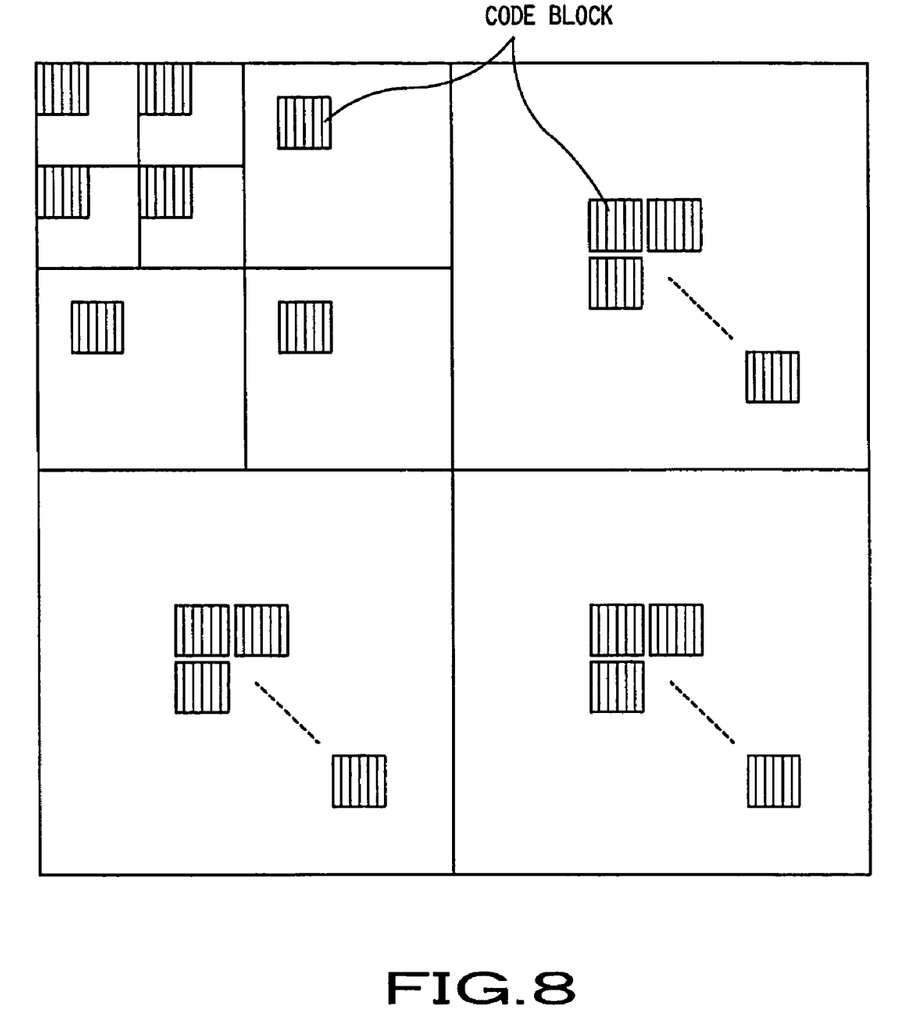
FIG. 8 is a view for explaining the relation between a code block and a subband.

The acquired quantization coefficients are divided into rectangular blocks (hereinafter referred to as code blocks) having a predetermined size (for example, 32×32 or 64×64), which are processing units used for entropy coding, for each subband. FIG. 8 shows the positional relation of code blocks in a subband. In FIG. 8, each subband, wavelet-transformed three times, is divided into code blocks having a size of 64×64.

Figures 9A, 9B, 9C:
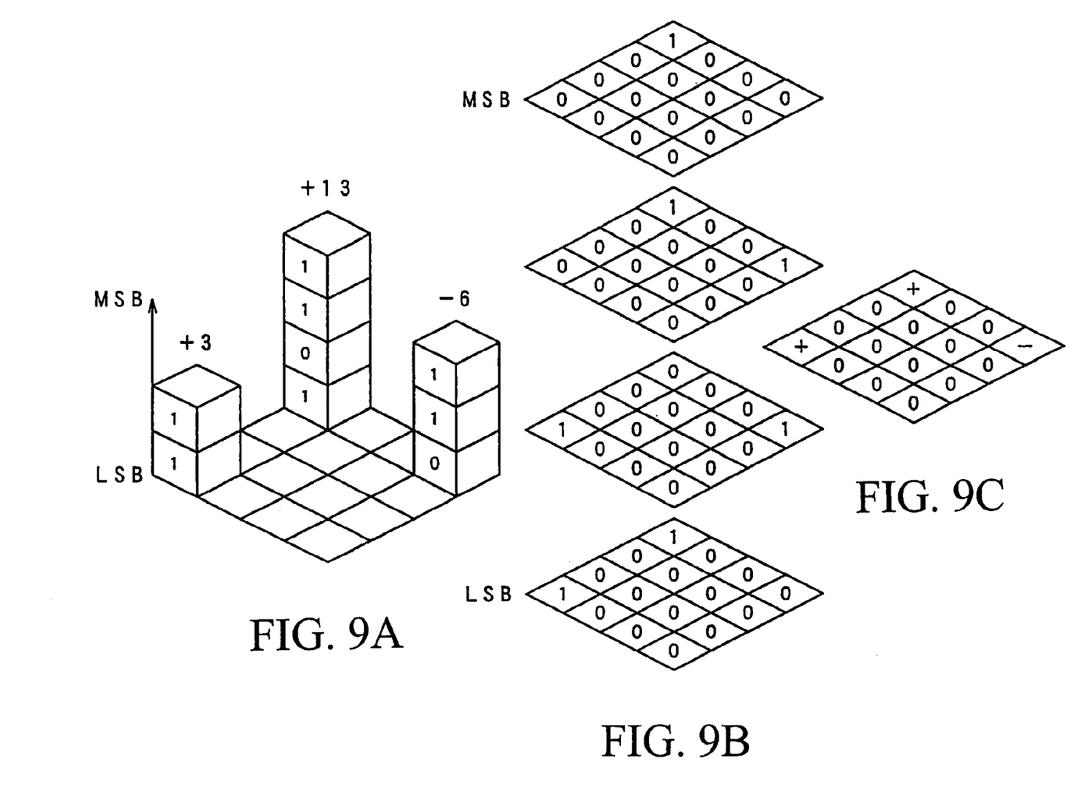
FIG. 9A shows quantization coefficients including 16 coefficients in total.
FIG. 9B shows a bit plane represented by the absolute values of the coefficients.
FIG. 9C shows a bit plane of codes.

The quantization coefficients for code blocks are developed on bit planes of MSB (most significant bit) to LSB (least significant bit). The concept of this bit plane will be described with reference to FIGS. 9A to 9C. In FIG. 9A, it is assumed that quantization coefficients made up of four vertical coefficients by four horizontal coefficients, that is, 16 coefficients in total, are used. The maximum absolute value of these 16 coefficients is 13, which is expressed as 1101 in binary expression. Therefore, the bit planes including the absolute values of the coefficients are four bit planes as shown in FIG. 9B. The elements of each bit plane take a value of 0 or 1. As for the sign of the quantization coefficients, −6 is the only negative value and the other values are 0 or positive values. Therefore, the bit plane of signs is formed as shown in FIG. 9C.

After that, bit modeling, which is entropy coding called EBCOT (embedded coding with optimized truncation) prescribed by the JPEG-2000 standard, and arithmetic coding are performed on each code block. In EBCOT, from the MSB-side bit plane, each bit plane is divided into the following three types of coding passes (a) to (c), and then bit modeling and arithmetic coding are performed thereon.

Figure 10:
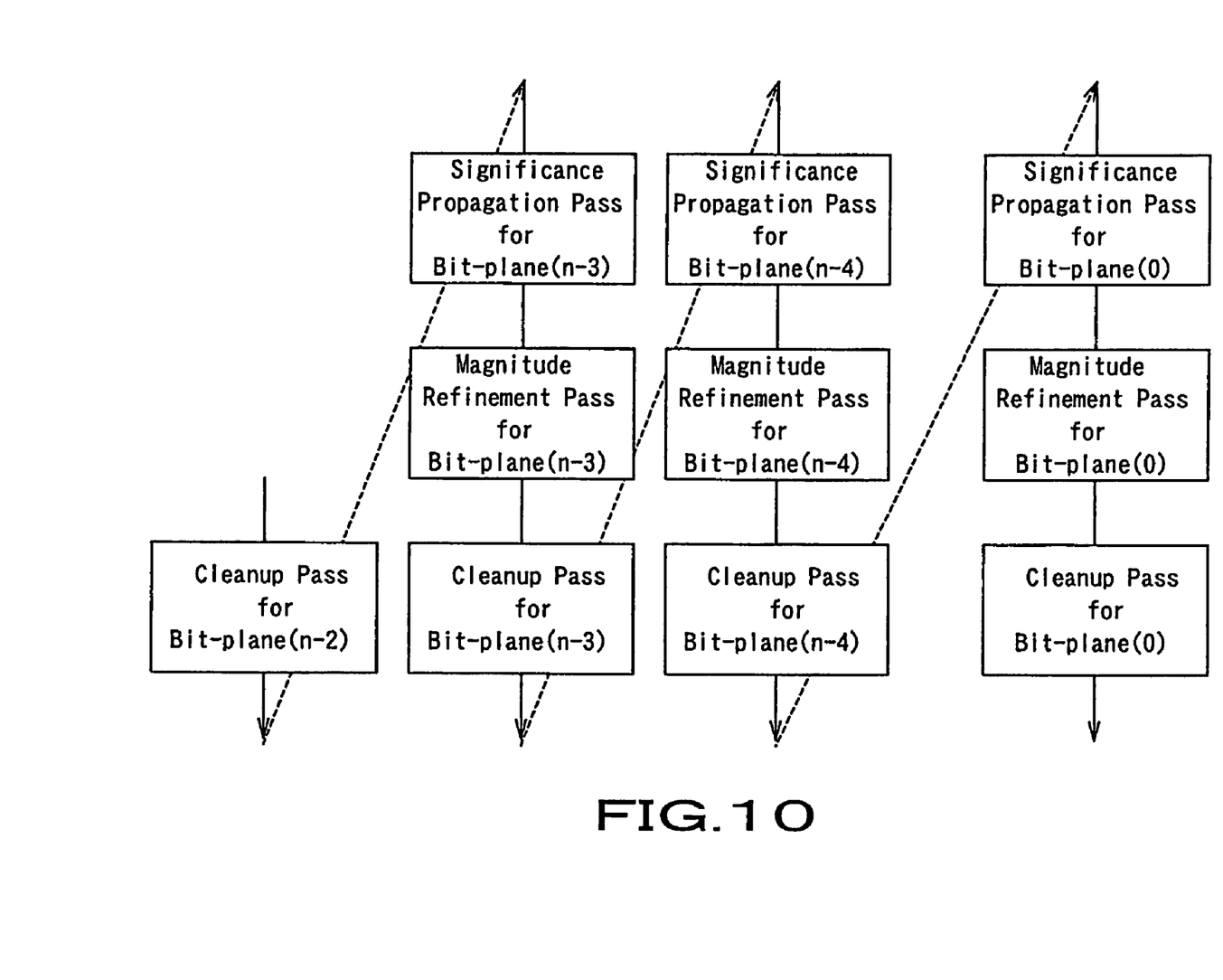
FIG. 10 is a view for explaining processing procedures of coding passes in a code block.

(a) Significance propagation pass
(b) Magnitude refinement pass
(c) Cleanup pass FIG. 10 shows the order of using the three coding passes. As shown in FIG. 10, first, a bit plane (n−2) (MSB) is coded by the cleanup pass (hereinafter properly referred to as CU pass). Next, coding proceeds sequentially toward the LSB-side and each bit plane is coded by using the significance propagation pass (hereinafter properly referred to as SP pass), the magnitude refinement pass (hereinafter properly referred to as MR pass) and the CU pass in this order.

Referring again to FIG. 6, information of the coding pass "Codingpass[n]" ($0 \leq n \leq$ All_codingpass) of each code block is supplied to each unit except for the coding pass distortion quantity calculating unit 23. As this coding pass is actually coded, the quantity of code of each coding pass is generated and the distortion value of the coding pass can be calculated. This will now be described in detail.

As the quantization coefficients of each coding pass, a quantization coefficient at a position k in a code block is denoted by s[k]. A coefficient in the case where all the lower bits (to the LSB-side) following a coding pass (n) (where $0 \leq n \leq X-1$ holds and it is assumed that X coding passes exist in the code block) are discarded, is denoted by s'[n][k]. The coding pass quantization coefficient distortion calculating unit 22 calculates the sum of squares of the difference between s'[n][k] and s[k] for the samples existing in the code block, as expressed by the following equation (13), and supplies the sum SSE[n] of the quantization coefficient distortion to the coding pass distortion quantity calculating unit 23.

$$SSE[n] = \Sigma(s'[n][k] - s[k])^2 \quad (13)$$

The coding pass distortion quantity calculating unit 23 multiplies the sum SSE[n] of the quantization coefficient distortion of the coding pass (n) by the square of a weighting coefficient Wc set for each of the components signals Y0, Y1 and Y2, to calculate the quantity of distortion D[n] of the coding pass (n), as expressed by the following equation (14), and supplies this quantity of distortion D[n] to the coding pass RD inclination value calculating unit 25. The sum SSE[n] is multiplied by the square of the weighing coefficient Wc because it is known that the quantity of distortion is generally proportional to the square of quantization step size. It is preferred that the weighting coefficient Wc is set at a value that minimizes the absolute value distortion of an image to be outputted.

$$D[n] = Wc^2 \times SSE[n] \quad (14)$$

On the other hand, the coding pass code quantity calculating unit 24 actually encodes the coding pass and supplies the data length (for example, byte length) ΔR[n] of the resulting encoded code stream to the coding pass RD inclination value calculating unit 25.

The coding pass RD inclination value calculating unit 25 calculates the RD inclination value RD[n] of the coding pass (n) according to the following equation (15) and supplies this RD inclination value RD[n] to the code quantity calculating unit 26.

$$RD[n] = \Delta D[n] / \Delta R[n] \quad (15)$$

ΔD[n] in the equation (15) is the quantity of distortion that is reduced in the case where the code of the coding pass (n) of all the coding passes in the code block is included in the encoded code stream. It can be defined by the following equation (16).

$$\Delta D[n] = D[n] - D[n-1] \text{ (where } \Delta D[0] = D[0]) \quad (16)$$

Referring to a threshold value RD_th of the RD inclination value for target code quantity control, the code quantity calculating unit 26 selects all the coding passes (n) in all the code blocks within one screen that have an RD[n] value equal to or larger than the threshold value RD_th, that is, those satisfying the following equation (17). Then, the code quantity calculating unit 26 supplies the quantity of code C_all of all the coding passes (n) in all the code blocks within one screen that satisfy the condition of the equation (17) to the code quantity control unit 27.

$$RD\_th \leq RD[n] \quad (17)$$

The code quantity control unit 27 selects coding passes with reference to the quantity of code C_all to meet a target code quantity C_target of the ultimate encoded code stream. Typically, the selection is made sequentially from the coding pass having the largest RD inclination value RD[n] to the coding passes having smaller values. As a result, the code quantity control unit 27 can ultimately output an encoded code stream having the target code quantity.

However, in the above-described technique, since the code quantity calculating unit 26 calculates the quantity of code C_all of all the coding passes (n) in all the code blocks within one screen that satisfy the condition of the equation (17), the more the quantity of code C_all exceeds the target code quantity, the more waste occurs.

Thus, the quantity of code may be included in the encoded code stream sequentially from the coding pass having the largest RD inclination value RD[n] and the coding control may be ended when the quantity of code included in the encoded code stream has reached the target code quantity. This can be realized by causing the code quantity calculating unit 26 and the code quantity control unit 27 to operate in parallel.

Figure 11:
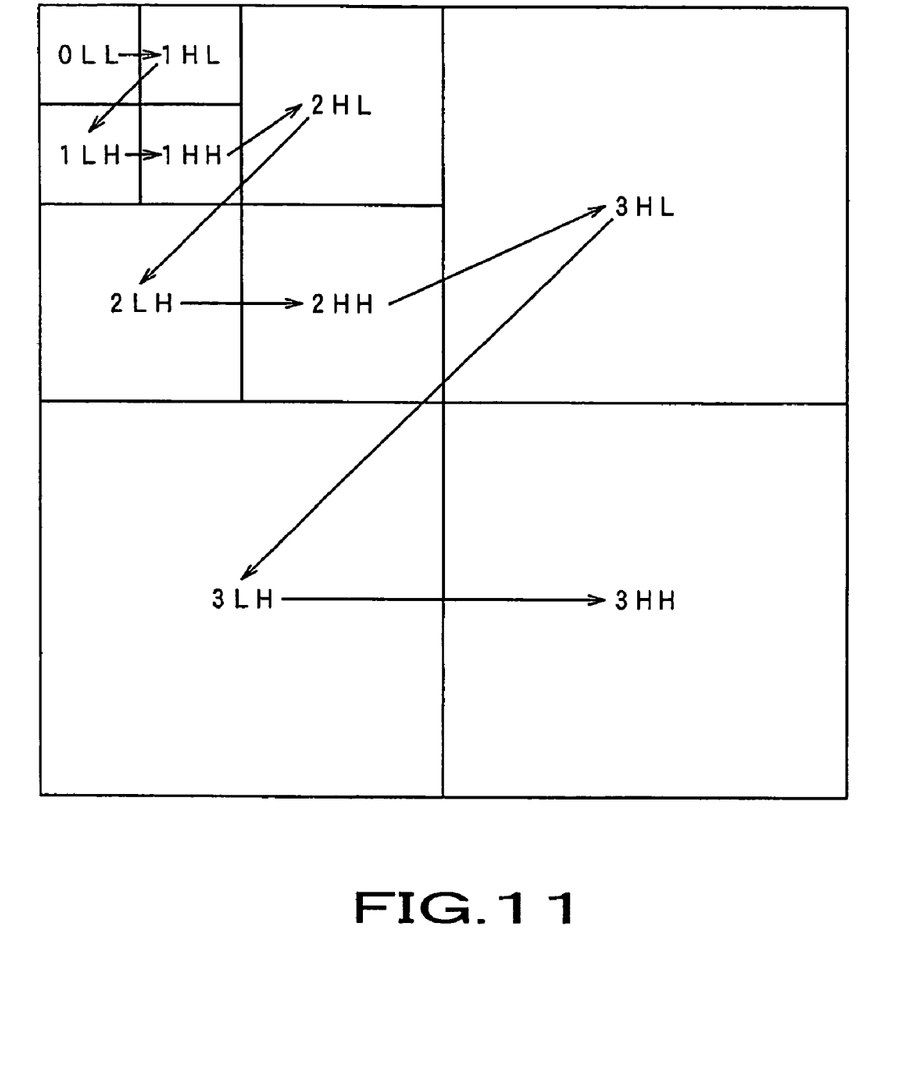
FIG. 11 is a view for explaining priority given to plural subbands.

Also, if the quantity of code is included in the encoded code stream sequentially from the low-range subband to the high-range subband and sequentially from the coding pass having the largest RD inclination value RD[n] to the coding passes having smaller values, as shown in FIG. 11, information of the low range containing more important information for the image is preferentially included in the code stream. Therefore, even with the same quantity of information, the subjective image quality improves. In FIG. 11, L and H represent the low range and high range, respectively, and the numerals prefixed to L and H represent division levels. For example, 1LH represents a subband having a low range in the horizontal direction and a high range in the vertical direction and having a division level=1.

In the case where an image includes luminance information and color-difference information, if the quantity of code is included in the encoded code stream sequentially from the luminance information to the color-difference information and sequentially from the coding pass having the largest RD inclination value RD[n] to the coding passes having smaller values, the luminance information containing more important information for the image is preferentially included in the code stream. Therefore, even with the same quantity of information, the subjective image quality improves.

While rate control is performed on each coding pass in the above description, the rate control unit 21 may also perform rate control on each bit plane.

(3) Third Embodiment

Figure 12:
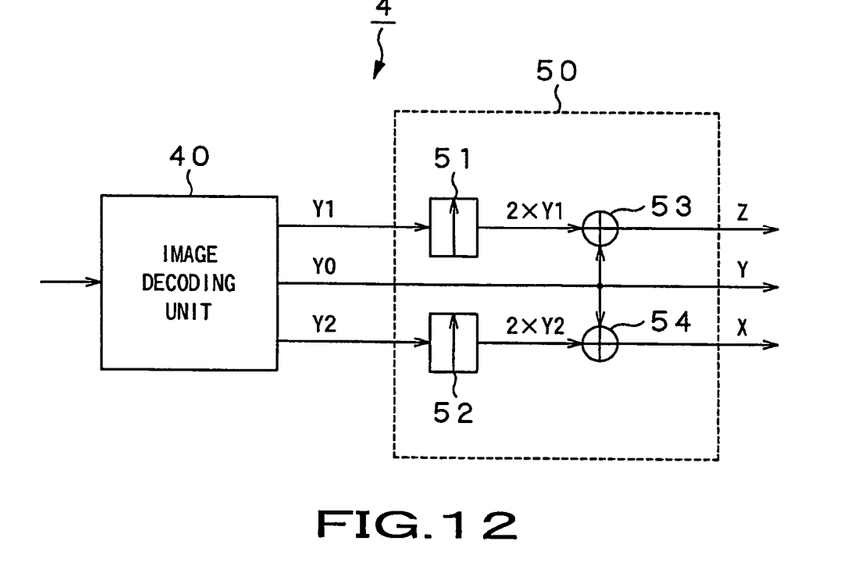
FIG. 12 is a view showing a schematic structure of an image decoding apparatus in a third embodiment.

Next, the structure and operation of an image decoding apparatus in a third embodiment will be described. FIG. 12 shows a schematic structure of an image decoding apparatus 4 in the third embodiment. As shown in FIG. 12, the image decoding apparatus 4 includes an image decoding unit 40 for expanding and decoding an inputted encoded code stream according to the JPEG-2000 system, and an inverse color converter unit 50 for performing predetermined conversion on three component signals supplied from the image decoding unit 40.

The image decoding unit 40 decodes and expands an encoded code stream according to the JPEG-2000 system and supplies the decoded three component signals Y0, Y1 and Y2 to the inverse color converter unit 50.

The inverse color converter unit 50 includes multiplier units 51, 52, and adder units 53, 54, as shown in FIG. 12. The multiplier unit 51 multiplies Y1 by 2. The adder unit 53 adds the result of the multiplication (2×Y1) to Y0 and outputs Z, which is the result of the addition. The multiplier unit 52 multiplies Y2 by 2. The adder unit 54 adds the result of the multiplication (2×Y2) to Y0 and outputs X, which is the result of the addition. Y0 is directly outputted as Y. This color conversion can be expressed by the following equations (18) to (20).

$$X=2\times Y2+Y0 \quad (18)$$

$$Y=Y0 \quad (19)$$

$$Z=2\times Y1+Y0 \quad (20)$$

In this manner, the image decoding apparatus 4 can restore the original three component signals in the XYZ color space from X, Z and Y that have been converted on the coordinate axis about a point representing an achromatic color by the image encoding apparatus.

(3-2) First Modification

As described above, in the case of displaying a decoded image on a display or the like, gamma correction corresponding to the display may have to be performed before outputting the image.

Figure 13:
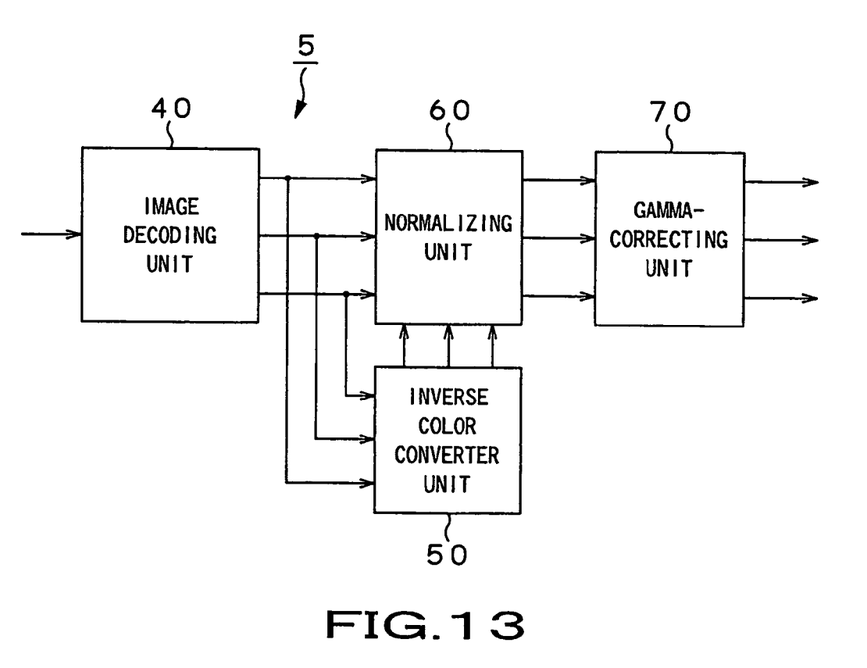
FIG. 13 is a view showing a schematic structure of an image decoding apparatus having a gamma-correcting unit.

In such a case, a normalizing unit 60 and a gamma-correcting unit 70 are provided on the stage subsequent to the image decoding unit 40 to enable performing gamma correction, as in an image decoding apparatus 5 shown in FIG. 13.

The normalizing unit 60 performs normalization processing on the three component signals supplied from the image decoding unit 40 or the three component signals that have been color-converted by the inverse color converter unit 50, so that the values of the component signals fall within a range of 0 to 1.

The gamma-correcting unit 70 performs gamma correction on the three component signals after the normalization, and outputs the gamma-corrected three component signals as component signals of the ultimate decoded image. For example, if the gamma coefficient is 2.4, the gamma-correcting unit 70 can perform gamma correction according to the following equations (21) to (23).

$$X=X'^{2.4} \quad (21)$$

$$Y=Y'^{2.4} \quad (22)$$

$$Z=Z'^{2.4} \quad (23)$$

(3-3) Second Modification

In the third embodiment and the first modification, the decoded image are images in the XYZ color space. However, in the case of displaying a decoded image on a display device using the RGB color space such as a display monitor, conversion from the XYZ color space to the RGB color space must be carried out.

Figure 14:
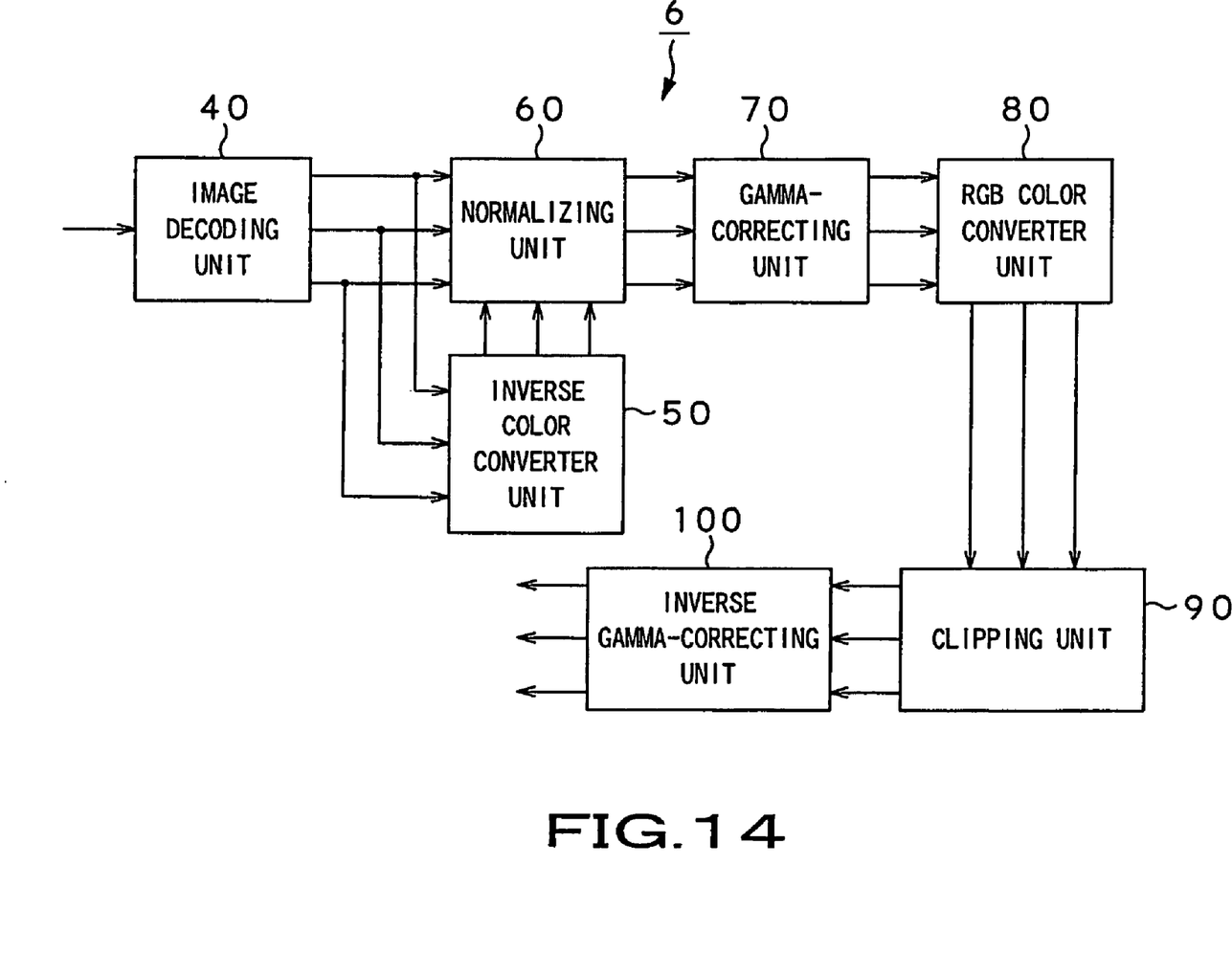
FIG. 14 is a view showing a schematic structure of an image decoding apparatus having an RGB converter unit for converting the XYZ color space to the RGB color space.

In such a case, in addition to the structure shown in FIG. 13, an RGB color converter unit 80, a clipping unit 90, and an inverse gamma-correcting unit 100 are provided on the stage subsequent to the gamma-correcting unit 70 to enable conversion to the RGB color space, as in an image decoding apparatus 6 shown in FIG. 14.

The RGB color converter unit 80 converts the gamma-corrected three component signals to three component signals of R, G and B, for example, according to the following equations (24) to (26).

$$R=3.24096X-1.53738Y-0.49861Z \quad (24)$$

$$G=-0.96924X+1.87596Y+0.04155Z \quad (25)$$

$$B=0.05563X-0.20397Y+1.05697Z \quad (26)$$

The clipping unit 90 clips the three component signals of R, G and B to values within a range of 0 to 1. That is, the clipping unit 90 substitutes for a value small than 0 and substitutes 1 for a value larger than 1.

The inverse gamma-correcting unit 100 performs inverse gamma correction on the three component signals after the clipping, for example, according to the above-described equations (10) to (12), and outputs the inversely gamma-corrected three component signals as component signals of the ultimate decoded image.

As is described above, according to this invention, since an X signal and a Z signal of an image in the XYZ color space are converted by the encoding side to signals on the coordinate axis about a point representing an achromatic color, the image in the XYZ color space can be compressed and expanded highly efficiently.

While the invention has been described in accordance with certain preferred embodiments thereof illustrated in the accompanying drawings and described in the above description in detail, it should be understood by those ordinarily skilled in the art that the invention is not limited to those embodiments, but various modifications, alternative constructions or equivalents can be implemented without departing from the scope and spirit of the present invention as set forth and defined by the appended claims.

What is claimed is:

1. An image encoding apparatus comprising:
    a color converter unit for converting an X signal and a Z signal of an image in an XYZ color space to component signals of a coordinate system about a point representing an achromatic color; and
    an image coding unit for encoding each of the component signals after color conversion by the color converter unit and a Y signal.

2. The image encoding apparatus as claimed in claim 1, wherein the color converter unit generates a first component signal by subtracting the Y signal from the Z signal and then dividing the result of the subtraction by 2, and also generates a second component by subtracting the Y signal from the X signal and then dividing the result of the subtraction by 2.

3. The image encoding apparatus as claimed in claim 1, wherein the image coding unit comprises:
    a filtering unit for performing hierarchical filtering processing on the image including each of the component signals after color conversion by the color converter unit and the Y signal to generate plural subbands;
    a quantizing unit for dividing each coefficient of the input image after the filtering processing by a quantization step size and thus quantizing each coefficient;
    a code block generating unit for dividing the subbands to generate plural code blocks having a predetermined size;
    a bit plane generating unit for generating plural bit planes from a most significant bit to a least significant bit for each of the code blocks;
    a bit modeling unit for performing bit modeling on the plural bit planes generated by the bit plane generating unit;
    a coding pass generating unit for generating a coding pass for each bit plane on which the bit modeling has been performed;
    a coding unit for arithmetically coding the coding pass generated by the coding pass generating unit; and
    a code quantity control unit for controlling a quantity of code to reach a predetermined target quantity of code on the basis of an arithmetic code generated by the coding unit;
    the code quantity control unit controlling the quantity of code by using different weighting coefficients for each of the component signals after the color conversion and the Y signal, respectively.

4. The image encoding apparatus as claimed in claim 3, wherein the code quantity control unit comprises:
    a rate distortion inclination value calculating unit for calculating a rate distortion inclination value for each bit plane or each coding pass within each code block, the rate distortion inclination value being a ratio of a quantity of distortion to be reduced in the case of including the bit plane or coding pass into an encoded code stream to a quantity of code when the bit plane or coding pass is encoded; and
    a control unit for performing control to include bit planes or coding passes into the encoded code stream sequentially from a bit plane or coding pass having the largest rate distortion inclination value to a bit plane or coding pass having the smallest rate distortion inclination value, until a target quantity of code is reached.

5. The image encoding apparatus as claimed in claim 4, wherein the control unit performs control to include each of the bit planes or coding passes into the encoded code stream sequentially from a lowest-range subband to a highest-range subband.

6. The image encoding apparatus as claimed in claim 4, wherein the control unit performs control to include each of the bit planes or coding passes into the encoded code stream sequentially from a luminance component to a color-difference component.

7. An image encoding method comprising:
    a color conversion step of converting an X signal and a Z signal of an image in an XYZ color space to component signals of a coordinate system about a point representing an achromatic color; and
    an image coding step of encoding each of the component signals after color conversion at the color conversion step and a Y signal.

8. The image encoding method as claimed in claim 7, wherein at the color conversion step, a first component signal is generated by subtracting the Y signal from the Z signal and then dividing the result of the subtraction by 2, and a second component signal is generated by subtracting the Y signal from the X signal and then dividing the result of the subtraction by 2.

9. An image decoding apparatus for decoding an encoded code stream acquired by color-converting an X signal and a Z signal of an image in an XYZ color space to component signals of a coordinate system about a point representing an achromatic color and then encoding each of component signals after color conversion and a Y signal, the apparatus comprising:
    an image decoding unit for decoding the encoded code stream; and
    an inverse color converter unit for inversely converting each component signal after decoding by the image decoding unit to a coordinate system in the XYZ color space.

10. The image decoding apparatus as claimed in claim 9, wherein in the color conversion, a first component signal is generated by subtracting the Y signal from the Z signal and then dividing the result of the subtraction by 2, and a second component signal is generated by subtracting the Y signal from the X signal and then dividing the result of the subtraction by 2, and
    the inverse color converter unit restores the Z signal by multiplying the first component signal by 2 and then adding the Y signal to the result of the multiplication, and also restores the X signal by multiplying the second component signal by 2 and then adding the Y signal to the result of the multiplication.

11. The image decoding apparatus as claimed in claim 9, further comprising an RGB converter unit for converting the X signal and the Z signal restored by the inverse color converter unit and the Y signal decoded by the image decoding unit to component signals in an RGB color space.

12. An image decoding method for decoding an encoded code stream acquired by color-converting an X signal and a Z signal of an image in an XYZ color space to component signals of a coordinate system about a point representing an achromatic color and then encoding each of component signals after color conversion and a Y signal, the method comprising:

an image decoding step of decoding the encoded code stream; and an inverse color conversion step of inversely converting each component signal after decoding at the image decoding step to a coordinate system in the XYZ color space.

13. The image decoding method as claimed in claim 12, wherein in the color conversion, a first component signal is generated by subtracting the Y signal from the Z signal and then dividing the result of the subtraction by 2, and a second component signal is generated by subtracting the Y signal from the X signal and then dividing the result of the subtraction by 2, and at the inverse color conversion step, the Z signal is restored by multiplying the first component signal by 2 and then adding the Y signal to the result of the multiplication, and the X signal is restored by multiplying the second component signal by 2 and then adding the Y signal to the result of the multiplication.

14. The image decoding method as claimed in claim 12, further comprising an RGB conversion step of converting the X signal and the Z signal restored at the inverse color conversion step and the Y signal decoded at the image decoding step to component signals in an RGB color space.

* * * * *